United States Patent
Kusakabe

(10) Patent No.: US 9,159,117 B2
(45) Date of Patent: Oct. 13, 2015

(54) DRAWING DATA GENERATION APPARATUS, DRAWING DATA GENERATION METHOD, PROGRAM, AND DRAWING DATA GENERATION SYSTEM FOR CHANGING MAGNIFICATION OF DISPLAYED IMAGES

(71) Applicant: CANON KABUSHIKI KAISHA, Tokyo (JP)

(72) Inventor: Minoru Kusakabe, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 224 days.

(21) Appl. No.: 13/835,761

(22) Filed: Mar. 15, 2013

(65) Prior Publication Data

US 2013/0249952 A1 Sep. 26, 2013

(30) Foreign Application Priority Data

Mar. 23, 2012 (JP) .................... 2012-067577

(51) Int. Cl.
*G06T 3/40* (2006.01)
(52) U.S. Cl.
CPC ......................................... *G06T 3/40* (2013.01)
(58) Field of Classification Search
CPC .......................................................... G06T 3/40
USPC ......................................................... 345/418
See application file for complete search history.

(56) References Cited

U.S. PATENT DOCUMENTS

| | | | |
|---|---|---|---|
| 6,411,274 B2* | 6/2002 | Watanabe et al. | 345/684 |
| 7,474,960 B1* | 1/2009 | Nesbitt | 701/533 |
| 2002/0060680 A1* | 5/2002 | Soohoo | 345/428 |
| 2007/0083819 A1* | 4/2007 | Shoemaker | 715/767 |
| 2010/0026721 A1* | 2/2010 | Park et al. | 345/660 |
| 2010/0079492 A1* | 4/2010 | Nakamura | 345/634 |
| 2012/0188283 A1* | 7/2012 | Ohashi | 345/660 |

FOREIGN PATENT DOCUMENTS

JP 7-320085 A 12/1995

* cited by examiner

*Primary Examiner* — Kee M Tung
*Assistant Examiner* — Grace Q Li
(74) *Attorney, Agent, or Firm* — Canon USA, Inc., IP Division

(57) ABSTRACT

A drawing data generation apparatus includes an image acquiring unit, a magnification acquiring unit, and a generation unit. In this case, the generation unit generates the drawing data in a first layout and in a second layout, and, in the first layout, a partial area in the display image is displayed with the first magnification at a position where the partial area has been displayed and, in the second layout, a partial area in the display image is displayed with the second magnification at a position where the partial area has been displayed, the partial area and a surrounding area of the partial area are displayed with a lower magnification than the second magnification, and the partial area with the second magnification and the partial area with the low magnification do not overlap.

9 Claims, 8 Drawing Sheets

DRAWING DATA GENERATION APPARATUS, DRAWING DATA GENERATION METHOD, PROGRAM, AND DRAWING DATA GENERATION SYSTEM FOR CHANGING MAGNIFICATION OF DISPLAYED IMAGES

BACKGROUND OF THE INVENTION

1. Field of the Invention

The present invention relates to drawing data generation apparatuses, drawing data generation methods, programs, and drawing data generation systems which generate drawing data for displaying a captured image on a display.

2. Description of the Related Art

In the past, there have been various methods which display an image by changing a display magnification of the display image. For example, when a zoom-in operation is performed on a focus area in an image, the display magnification of the entire image may be changed. Alternatively, a zoomed-in image may be displayed over an original image in an overlap area partially formed only in the vicinity of the focus area. Another method has also been proposed which displays a zoomed-in image to allow a comparison between focus areas before and after a zoom-in operation. (Japanese Patent Laid-Open No. 7-320085).

Japanese Patent Laid-Open No. 7-320085 discloses a method which displays a zoomed-in image of a focus area in an overlap area formed in an area excluding the focus area.

According to Japanese Patent Laid-Open No. 7-320085, an overlap area is newly formed in an area excluding a focus area designated by a user for zoom-in display. This allows display within a screen of an image displayed with the original display magnification for observation and an image displayed with a display magnification for zoom-in display so that they may be compared and observed.

For an observation by scrolling a large image, the observation position is moved by the scroll operation, and the position of the viewpoint of a user who is watching a display screen may not be moved or may be moved only within a narrow limited range. This is because moving the viewpoint with scrolling may cause a user to miss a part where he or she was watching and confuse him or her. An example of a large image to be observed by scrolling may be a map or an image for a medical pathological diagnosis. When such an image is observed by scrolling and the display magnification is repeatedly changed, the image is desirably displayed by preventing the movement of a user's viewpoint against a screen as much as possible. However, the method according to Japanese Patent Laid-Open No. 7-320085 may display a zoomed-in image to be observed at a position on a screen excluding an area designated as a focus area when it is intended to zoom in an image in the focus area for observation. As a result, the viewpoint must be moved every time a zoomed-in image is displayed, which may make the observation work inefficient.

SUMMARY OF THE INVENTION

Accordingly, the present invention provides a drawing data generation apparatus which generates drawing data allowing fewer movements of a user's viewpoint for observing a captured image and a comparison between images before and after a zoom-in operation.

According to an aspect of the present invention, there is provided a drawing data generation apparatus including an image acquiring unit which acquires data on a captured image, a magnification acquiring unit which acquires a display magnification change instruction, and a generation unit which generates drawing data for displaying at least a part of the captured image as a display image on a display, wherein the generation unit generates the drawing data in a first layout when the magnification acquiring unit acquires an instruction to change to a first magnification and generates the drawing data in a second layout that is different from the first layout when the magnification acquiring unit acquires an instruction to change it to a second magnification that is higher than the first magnification, in the first layout, a partial area in the display image is displayed with the first magnification at a position where the partial area has been displayed, and, in the second layout, a partial area in the display image is displayed with the second magnification at a position where the partial area has been displayed, the partial area and a surrounding area of the partial area are displayed with a lower magnification than the second magnification, and the partial area with the second magnification and the partial area with the low magnification do not overlap.

Further features of the present invention will become apparent from the following description of exemplary embodiments with reference to the attached drawings.

DESCRIPTION OF THE EMBODIMENTS

Preferred embodiments of the present invention will be described in details with reference to drawings. This embodiment allows display of a display image by scrolling and scaling for fewer movements of the viewpoint of a user. A typical example of the image display in this embodiment may be image display for the purpose of observation on a medical image (particularly pathological image) in an application for displaying a large image. The following descriptions assume an image captured with a microscope which captures a still image with a high resolution.

Figure 1:
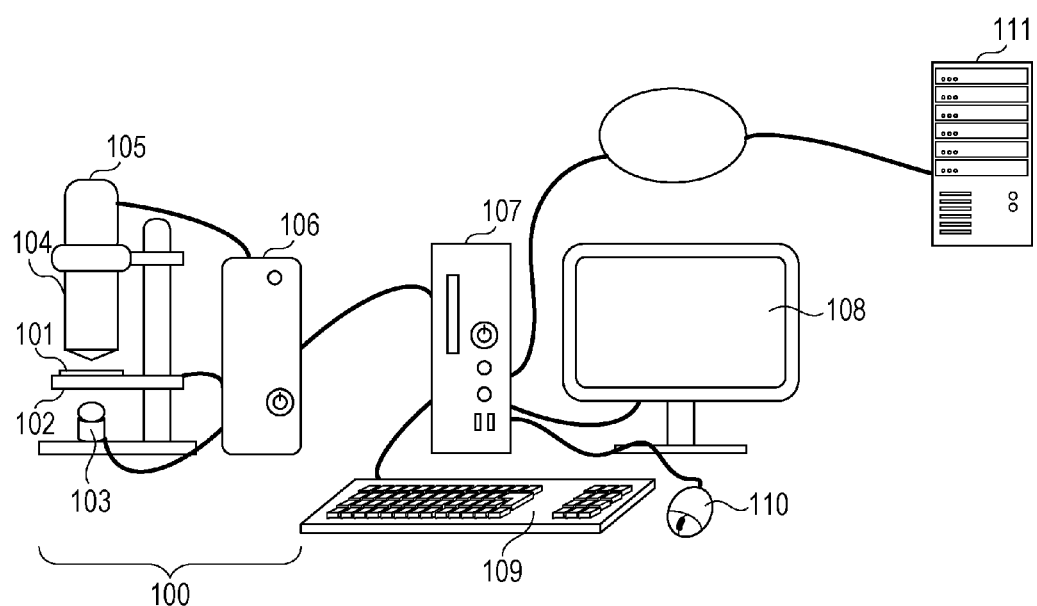
FIG. 1 is a configuration diagram of an apparatus according to the present invention.

FIG. 1 illustrates a configuration of an apparatus according to this embodiment. FIG. 1 illustrates a microscope apparatus 100 which may capture a still image. A prepared slide 101 is mounted on a sample that is a subject. The descriptions on this embodiment assume that the sample is a transparent object. A stage 102 is for mounting the prepared slide 101 thereon, and its position may be moved on a vertical plane in the direction of a light axis of an objective lens 104 to be used for image capturing. The stage 102 may also be moved in the direction of light axis for image capturing, and the position (focal point) in the direction of thickness of the subject may be changed. A light source 103 and the objective lens 104 are provided, and light from the light source 103 passes through the prepared slide 101 and enters to the objective lens 104. An image-capturing unit 105 captures an image of a subject formed by the objective lens 104. A controller 106 may perform operation control over the stage 102, light source 103, image-capturing unit 105 and so on. The objective lens 104 may be changed among a plurality of lenses to vary its magnification, or a zooming mechanism may be provided therein. In this case, the control over the lens changing or zooming function may be performed by the controller 106. A terminal 107 transmits an operation instruction to the microscope apparatus 100 and receives captured image data. The functions of the controller 106 may be implemented by the terminal 107.

A display 108 includes a screen allowing an operator to designate an operation instruction to the microscope apparatus 100 and displays information on a captured image. A keyboard 109 is used for inputting an operation instruction by an operator. A mouse 110 may be used for inputting an operation instruction by an operator. A server 111 is connected to the terminal 107 over a network and records image data captured by the microscope apparatus 100. The server 111 may directly be connected to the microscope apparatus 100 over a network.

The image display method (drawing data generation method) of this embodiment is implemented by the terminal 107 functioning as a drawing data generation apparatus, and a display 108 functioning as a display shows the resulting images. However, the microscope apparatus 100 may further include an operation instruction inputting unit such as a display and a button in addition to the aforementioned components, and the functions of the terminal 107 may be integrated into the controller 106 to implement the image display method of this embodiment by the controller 106. A system including the drawing data generation apparatus and the display is called a drawing data generation system herein.

Figure 2:
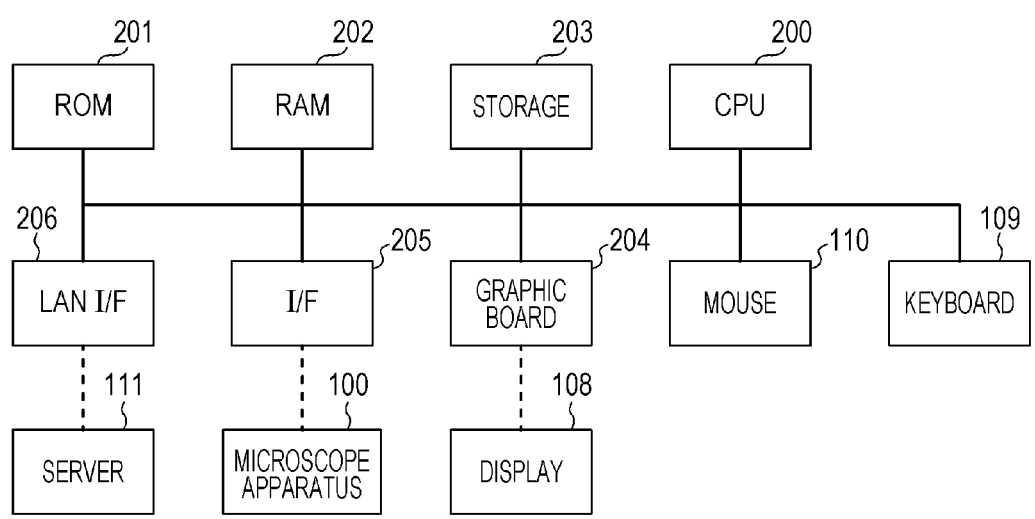
FIG. 2 is a configuration diagram of a computer which changes a display layout according to the present invention.

FIG. 2 illustrates a relationship between an internal configuration of the terminal (computer) 107 which implements the image display of this embodiment and external apparatuses. A CPU 200 performs operations necessary for processing. A ROM 201 stores a program and/or data, and a program and/or data stored therein may be read out. A program and/or data necessary for processing may be written to or be read from a RAM 202. A program and/or image data, for example, may be written to or read from a storage 203 which may include an HDD or SSD, for example. A graphic board 204 generates drawing data used for screen display. An interface 205 transmits and receives data when the terminal 107 communicates with the microscope apparatus 100 that is an external apparatus. A LAN interface 206 transmits and receives data when the terminal 107 communicates with the server 111 connecting to a network.

This embodiment, which will be described below, is implemented by a program executed by the CPU 200.

Next, with reference to FIG. 3, an example of the prepared slide 101 to be captured according to this embodiment will be described. A prepared slide creating step relating to this embodiment will only be described below with reference to FIG. 3, and the others will be omitted.

Figure 3:
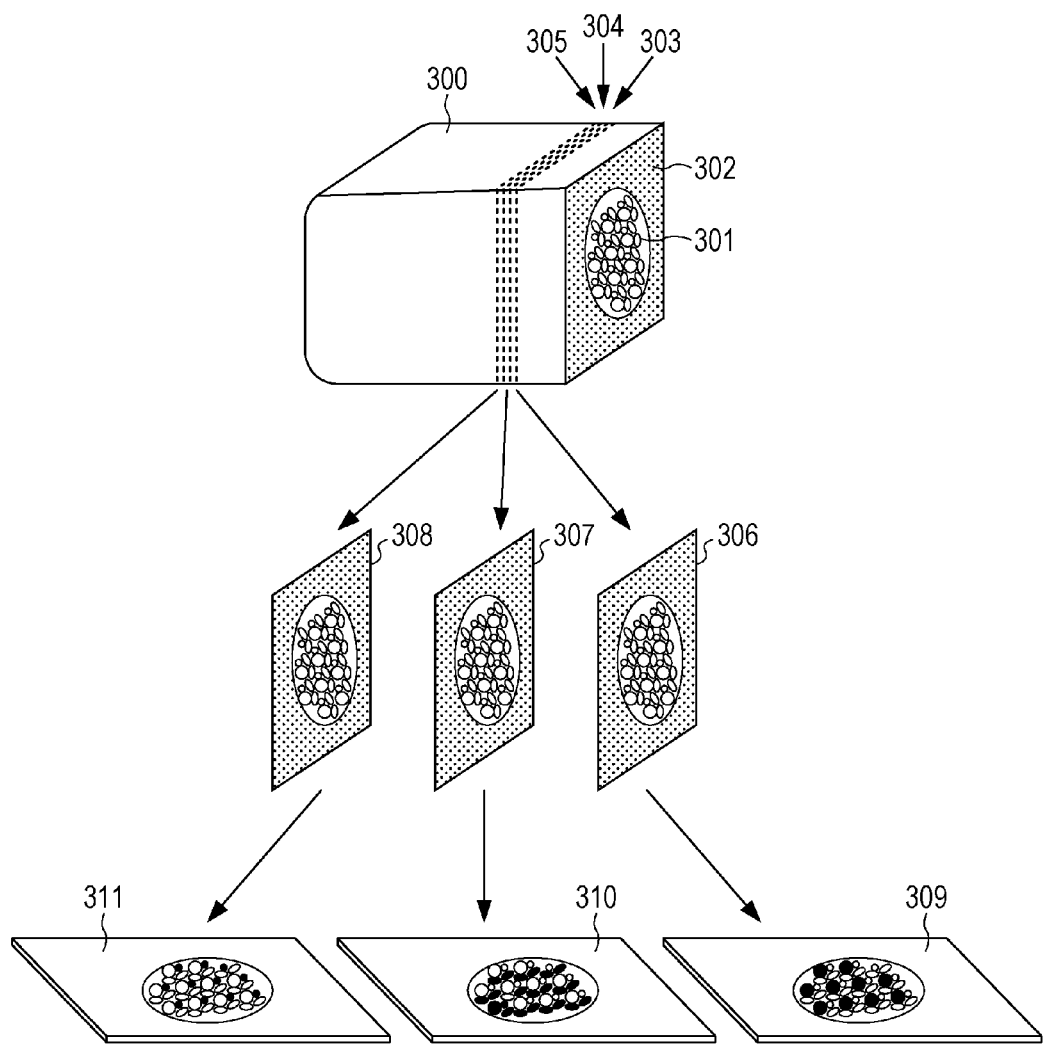
FIG. 3 illustrates an example of a prepared slide of a subject of imaging according to the present invention.

FIG. 3 illustrates an example of creation of the prepared slide 101 to be captured according to this embodiment, which is a prepared slide for a diagnosis on a tissue cell (hereinafter, called a tissue diagnosis) to be used for a pathological diagnosis. A prepared slide for a tissue diagnosis is created for observing a tissue structure of an analyte and the forms of individual cells.

A paraffin block 300 is acquired by embedding the analyte 301 cut out in the surgery in paraffin 302 to slice it. Normally, when a prepared slide is created for a pathological diagnosis, a sample mounted on a slide glass is cleaved sufficiently thin for the thickness of one cell. Thus, the serially cleaved samples may be regarded as cross-sections of the substantially same cell. Samples 306 to 308 are results of cleavage of the paraffin block 300 at serial cleavage positions 303 to 305. Prepared slides 309 to 311 are results of removing the samples 306 to 308 from the paraffin, mounting them on the slide glasses, applying different dyes or fluorescein sodium to them, and then mounting them on cover glasses. The observation of zoomed in or out images of the samples of the prepared slides may provide various information that is useful for a diagnosis. Furthermore, as seen on the prepared slides 309 to 311, the comparison and observation of states of substantially the same cells with different dyes or fluorescence may provide a plurality of different information pieces that are useful for a diagnosis. Therefore, the comparison and observation of zoomed in and/or images of samples at various positions within one prepared slide and the comparison and observation of prepared slides created by different creation methods may be important for acquiring useful information for a pathological diagnosis.

The observation of prepared slides for a pathological diagnosis as described above may require generation of images by capturing the prepared slides through a high-power objective lens. For that, the size of an image of one prepared slide is significantly large, and observation of the image may require repeated scrolling. It further may require observations of both of the tissue structure such as whether the subject is on the front side or internal side of an analyte and the states of individual cells, and there is a possibility that the display magnification is therefore changed for the observation. The viewpoint to a screen is desirably fixed as much as possible during scrolling for observing those images. Reducing movements of a viewpoint as few as possible when the display magnification is changed frequently during the same observation operation may reduce the movements of the viewpoint in the entire observation operations and thus improves efficiency of work. It is an object of this embodiment to reduce the movements of a user's viewpoint on a screen during an image observation operation in which scrolling and scaling may occur frequently on a display image to improve efficiency of work.

Figure 4:
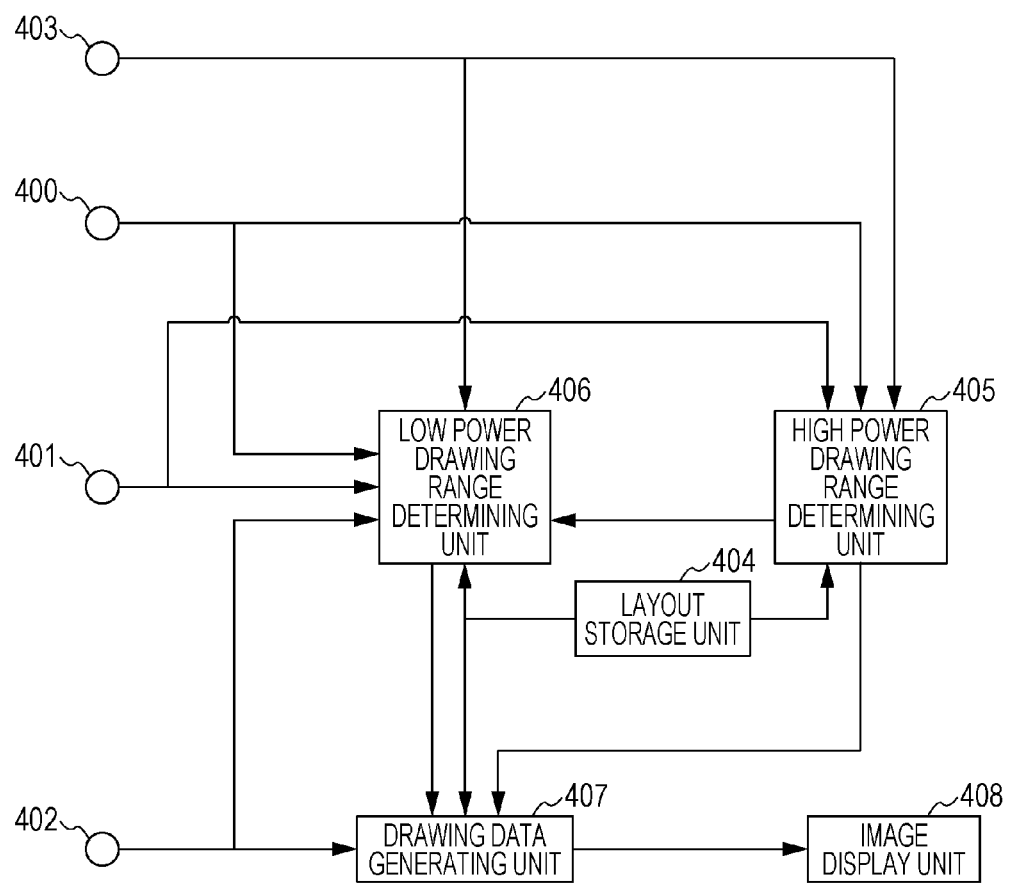
FIG. 4 is a functional block diagram of a display magnification changing method according to a first embodiment of the present invention.

FIG. 4 is a functional block diagram of a drawing data generation system according to this embodiment. A display magnification inputting unit 400 is used for inputting a display magnification. An instruction input by pressing a magnification change button displayed on a screen or through a wheel mounted on a mouse 110, a keyboard 109 or the like may be input thereto. The display magnification inputting unit 400 corresponds to a magnification acquiring unit. A focus-position change instruction inputting unit 401 may be used to input a focus-position change instruction to change a focus position (position of focus area) in an image. An instruction input by pressing a position change button displayed on a screen, moving the mouse 110, through the keyboard 109 or the like is input thereto. An image input terminal 402 is used for inputting image information to be displayed and corresponds to an image acquiring unit. A viewpoint position input terminal 403 acquires the position of a viewpoint on a predetermined screen and corresponds to a viewpoint position acquiring unit. A layout storage unit 404 stores a display layout and stores at least a layout for image display with a predetermined magnification or lower and a layout for display of an image having a lower magnification than the predetermined magnification and an image having the predetermined magnification or higher.

A high-magnification drawing range determining unit 405 determines a high-magnification drawing range that is a drawing range in an image for displaying an image at a display magnification that is equal to or higher than a predetermined magnification. The high-magnification drawing range determining unit 405 determines a drawing range on the basis of an input display magnification, a focus position, a position of viewpoint on the screen, and a stored layout. A low-magnification drawing range determining unit 406 determines a low-magnification drawing range that is a drawing range in an image for displaying an image at a display magnification that is lower than the predetermined magnification. The low-magnification drawing range determining unit 405 determines the drawing range on the basis of an input display magnification, a focus position, the position of viewpoint on the screen, a stored layout, and the high-magnification drawing range.

A drawing data generating unit 407 generates drawing data from an image input from the image input terminal 402 on the basis of the drawing ranges determined by the low-magnification drawing range determining unit 406 and high-magnification drawing range determining unit 405 and the layout acquired from the layout storage unit 404. An image display unit 408 displays drawing data generated by the drawing data generating unit 407 and corresponds to a display.

Figure 5:
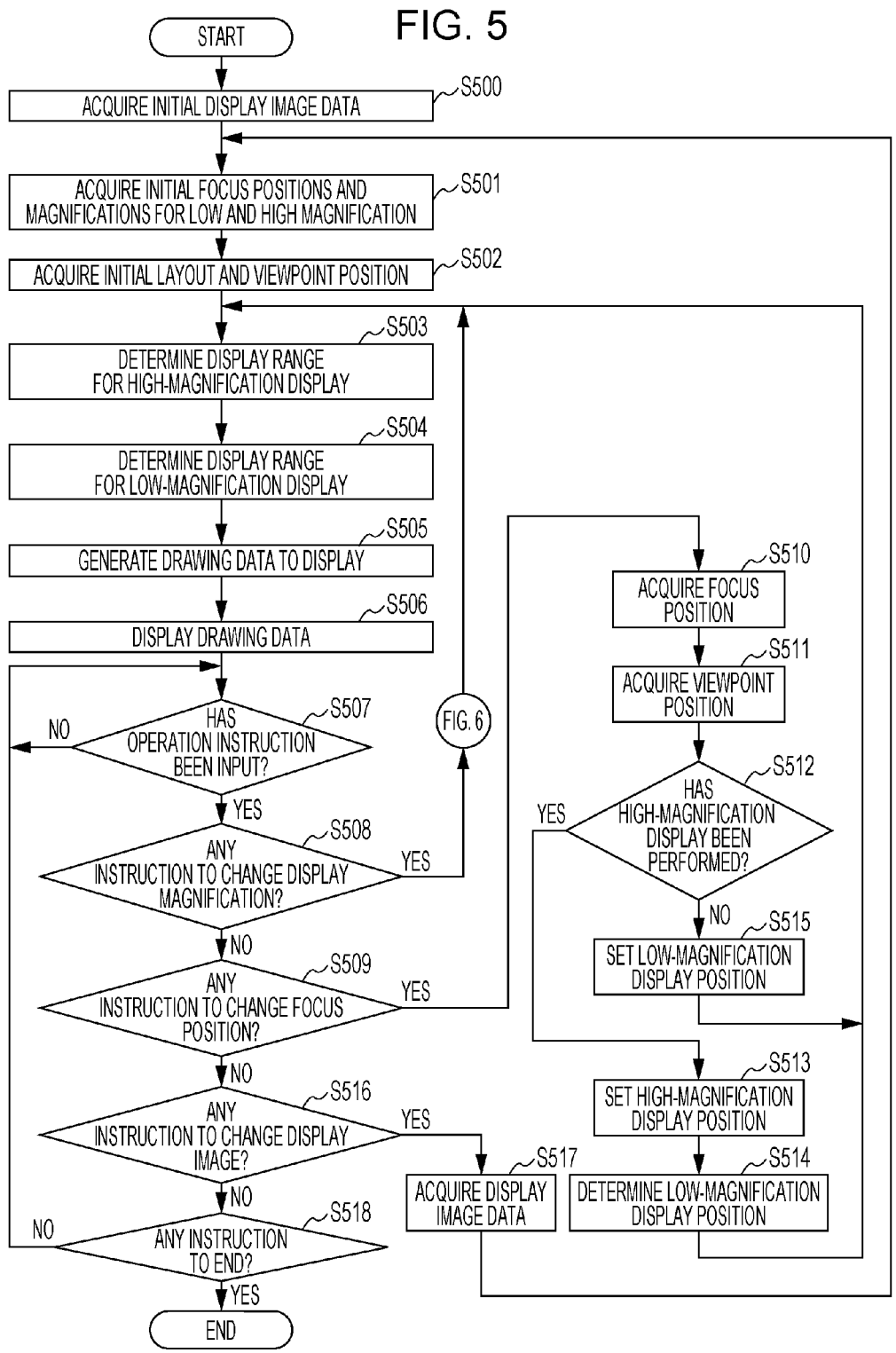
FIG. 5 is a flowchart illustrating a flow of operations by the display magnification changing method according to the first embodiment of the present invention.
Figure 6:
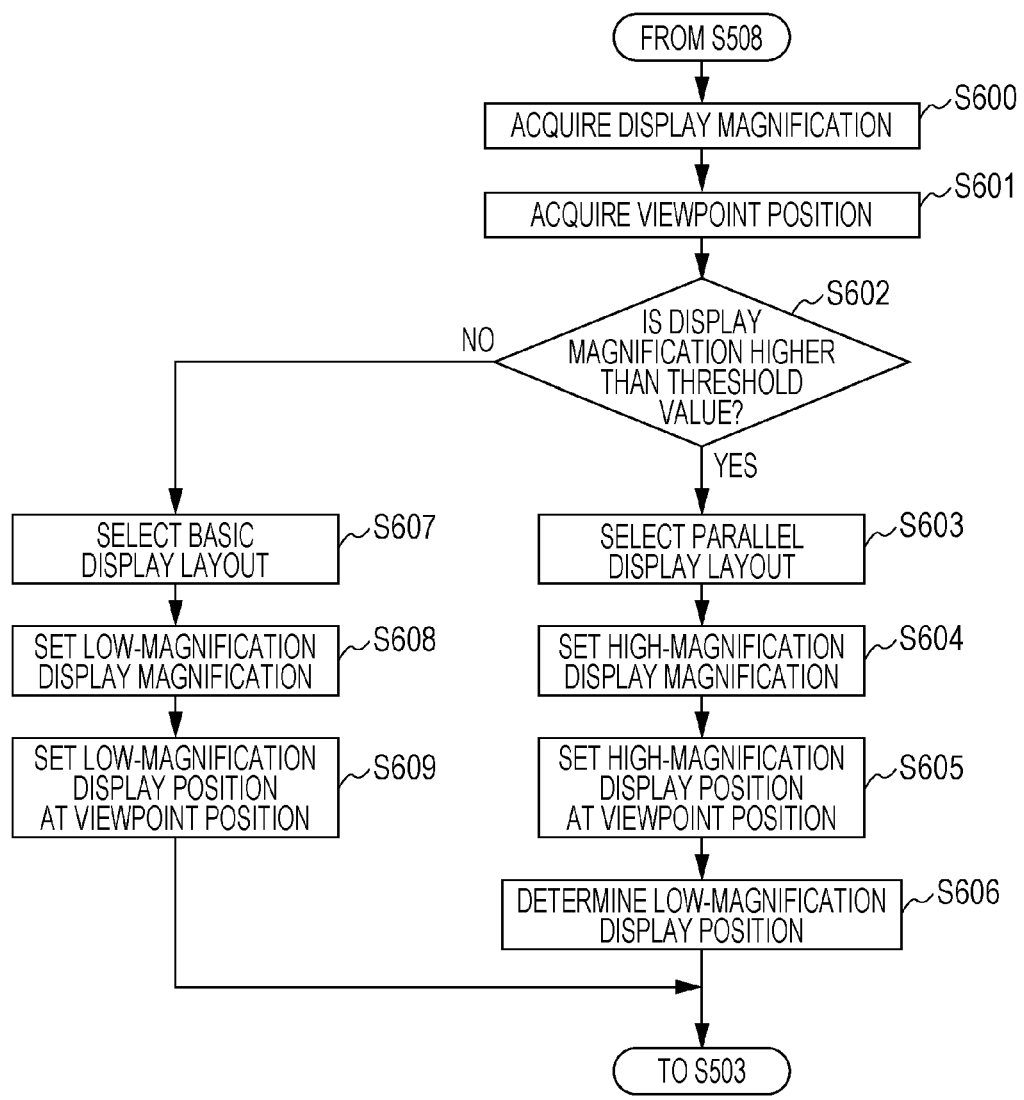
FIG. 6 is a flowchart illustrating a flow of operations by the display magnification changing method according to the first embodiment of the present invention.

FIG. 5 and FIG. 6 are flowcharts illustrating operation flows of the image display method according to this embodiment. Once the processing starts, image data for the initial display is first acquired in step 500. In step 501, initial focus positions and initial display magnifications for low-magnification display and high-magnification display are acquired. In step 502, a display layout and the position of viewpoint for the initial display are acquired. In step 503, a display range for high-magnification display is determined on the basis of the focus position, display magnification, the position of viewpoint, and display layout. In step 504, a display range for low-magnification display is determined on the basis of the focus position, display magnification, the position of viewpoint, display layout and high-magnification display range. In step 505, drawing data to be displayed is generated on the basis of the display range for high-magnification display, the display range for low-magnification display, and the display layout. In step 506, the display based on the drawing data generated in step 505 is implemented in the display 108.

When the image is displayed on the display 108, whether an operation instruction has been input or not is determined in step 507. If not, input of an operation instruction is waited. If it is determined in step 507 that an operation instruction has been input, the processing moves to step 508 where whether the operation instruction is an instruction to change the display magnification or not is determined. If it is determined in step 508 that the operation instruction is an instruction to change the display magnification, the processing moves to the processing in FIG. 6.

If it is determined in step 508 that the operation instruction is not an instruction to change the display magnification, the processing moves to step 509 where whether the operation instruction has been an instruction to change the focus position or not is determined. If it is determined in step 509 that it is an instruction to change the focus position, the focus position is acquired in step 510. Then in step 511, the position of viewpoint on a predetermined screen is acquired.

In step 512, whether high magnification image display is being performed on the present display or not is determined. If it is determined that high magnification image display is being performed, the image display position for high-magnification display is set in step 513. In step 513, the display position of an image for high-magnification display is set such that the focus area (partial area) designated by the change instruction may be displayed at the position on the screen corresponding to the position of viewpoint acquired in step 511. In step 514, an image display position for low-magnification display is determined. In step 514, as will be described below, the image display position for low-magnification display is determined such that the focus area on the high-magnification display image and the display of the low-magnification display image on the screen may not overlap. On the other hand, if it is determined in step 512 that the high magnification image display is not being performed, the display position for an image for low-magnification display is set in step 515. In step 515, the display position of an image for low-magnification display is set such that the focus area in the image designated by the change instruction may be displayed at the position on the screen corresponding to the position of viewpoint acquired in step 511. If the operation in step 514 or step 515 ends, the processing returns to step 503, and the processing is repeated.

On the other hand, if it is determined in step 509 that the operation instruction is not an instruction to change the focus position, the processing moves to step 516 where whether the operation instruction is an instruction to change the display image or not is determined. If it is determined in step 516 that it is an instruction to change the display image, the processing moves to step 517 where the display image data is acquired. The processing returns to step 501, and the same processing is repeated.

If it is determined in step 516 that the operation instruction is not an instruction to change the display image, the processing moves to step 518 where whether the operation instruction has been an end instruction or not is determined. If it is determined in step 518 that the operation instruction has not been an end instruction, the processing moves to step 507 where input of another operation instruction is waited. On the other hand, if it is determined in step 518 that the operation instruction is an end instruction, the processing ends.

Next, the processing to be performed if it is determined in step 508 that the operation instruction is an instruction to change the display magnification will be described with reference to FIG. 6.

Once the processing starts, the display magnification designated by the operation instruction is acquired in step 600. In step 601, the position of viewpoint on a predetermined screen is acquired. In step 602, whether the display magnification acquired in step 600 is higher than a predetermined threshold value or not is determined. If it is determined in step 602 that the display magnification is higher than the predetermined threshold value, the processing moves to step 603 where a parallel display layout for implementing low magnification image display and high magnification image display in parallel is selected as a display layout. In step 604, the display magnification for high-magnification display is set on the basis of the display magnification acquired in step 600. In step 605, it is set such that the focus area for a high-magnification display image may be displayed at the position of viewpoint on the screen acquired in step 601. In step 606, the image display position for low-magnification display is determined such that the displays of the focus area in a high-magnification display image and a low-magnification display image may not overlap on the screen. If the processing in step 606 ends, the processing returns to step 503 and the same processing is repeated.

On the other hand, if it is determined in step 602 that the display magnification is lower than a predetermined threshold value, the processing moves to step 607 where a basic display layout for implementing low magnification image display is selected. In step 608, the display magnification for low-magnification display is set on the basis of the display magnification acquired in step 600. In step 609, it is set such that the focus area in the low-magnification display image may not be displayed at the position of viewpoint on the screen acquired in step 601. If the processing in step 609 ends, the processing returns to step 503, and the processing is repeated.

Figure 7A:
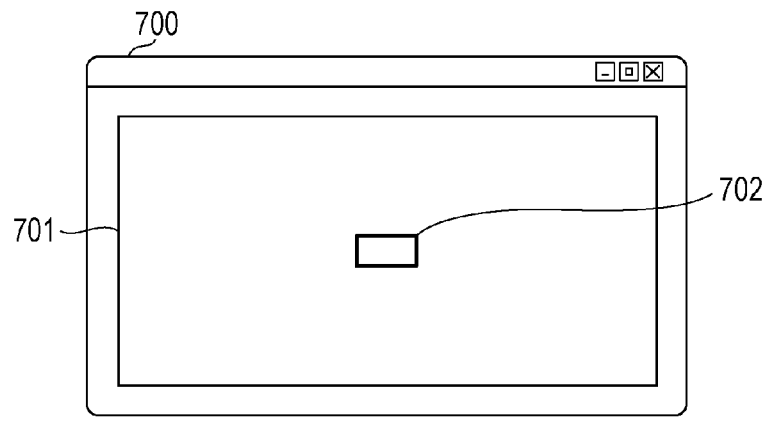
FIGS. 7A to 7C illustrate examples of a display screen according to the first embodiment of the present invention.

Next, a preferred example of the image display that is a feature of this embodiment will be described with reference to FIGS. 7A to 7C. First, with reference to FIG. 7A, the position of viewpoint which is an important matter in this embodiment will be described. FIG. 7A illustrates an application window 700. An image display area 701 corresponds to a display image. A predetermined position of viewpoint 702 is set at the center position of the image display area 701 in the example in FIG. 7A. The position of viewpoint 702 is predetermined from the relative position relationship within the image display area 701 or application window 700, independent of the display details of an image or the display layout.

Next, with reference to FIG. 7B, a preferred example of the image display using a basic display layout will be described. In FIG. 7B, a low-magnification display image 703 is displayed at a predetermined display magnification or lower. A cursor 704 is used for designating a position within a screen or selecting a button, not illustrated, to instruct an operation. In the basic display layout, when a display image is selected and the display magnification and the focus position in the image are set, the focus area in the image is displayed at the position of viewpoint 702 with the designated display magnification. When an instruction to change the display position is input, the display position is moved such that the focus area in the designated image may be displayed at the position of viewpoint. When the display magnification is changed, the focus area in an image is being displayed at the position of viewpoint in the basic display layout. In this case, the display magnification for the low-magnification display image 703 including the focus area is changed to the designated magnification. In the basic display layout (first layout), the focus area zoomed-in with the newly designated magnification (first magnification) is displayed at the position where the focus area has been displayed before the display magnification is changed.

Next, with reference to FIG. 7C, a preferred example of the image display using a parallel display layout (second layout) will be described. In FIG. 7C, a high magnification image display area 705 is used for implementing image display with a predetermined display magnification or higher and is displayed at a position including the position of viewpoint 702. A high-magnification display image 706 is displayed in a high magnification image display area, and a focus area in the image is displayed at the position of viewpoint 702. A focus area 707 is in the low-magnification display image 703.

Figure 7B:
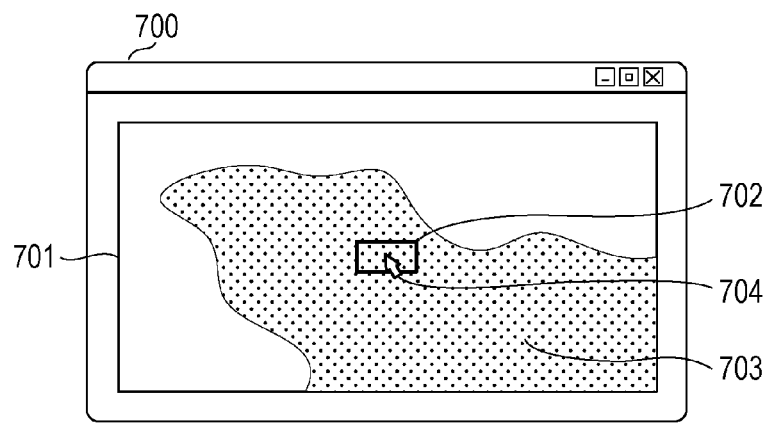

Next, FIG. 7B illustrates an initial display screen after an image is selected. There will be described changes in the display screen resulting in the state illustrated in FIG. 7C from a change in the display magnification of the focus area in the display image in accordance with an instruction by a user to a predetermined threshold value or higher. On the screen illustrated in FIG. 7B, when the display magnification is changed to a predetermined threshold value or higher, the display layout is changed. Thus, a new high magnification image display area 705 including the position of viewpoint 702 is generated. The designated display magnification (second magnification) is then used to zoom in the focus area such that the focus area may be displayed over the position of viewpoint in the high magnification image display area 705. On the other hand, an image is displayed with a low display magnification before an instruction to change the display magnification is input in an area excluding the high magnification image display area 705 within the image display area 701. In this case, the focus area in the low-magnification display image 703 is displayed such that it may not be hidden by the high magnification image display area 705. More specifically, as illustrated in FIG. 7C, the focus area 707 in the magnification display image 703 is displayed in an area excluding the high magnification image display area 705 within the image display area 701.

Figure 7C:
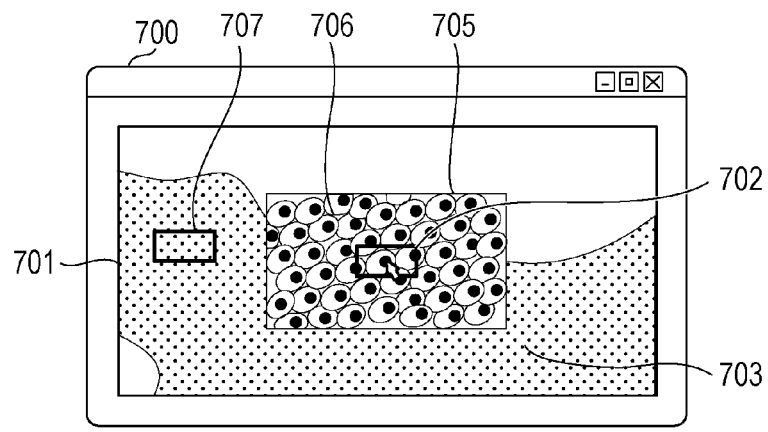

Next, there will be described changes in the display screen resulting in the state illustrated in FIG. 7B from a change in the display magnification of the focus area in the display image in accordance with an instruction by a user to a value that is lower than the predetermined threshold value when display is being implemented by using a parallel display layout as illustrated in FIG. 7C. When the display magnification is changed to a value that is lower than the predetermined threshold value on the display screen in FIG. 7C, the display layout is changed, and the high magnification image display area 705 is no longer displayed. As a result, the low-magnification display image 703 is only displayed within the image display area 701. Then, the display position is changed such that the focus area in the low-magnification display image 703 may be displayed at the position of viewpoint 702 to acquire the display state in FIG. 7B, without changing the display magnification.

The displays as illustrated in FIGS. 7A to 7C may allow a user to select an image observation in which he or she moves his/or her viewpoint and an image observation with fewer movements of his or her viewpoint, increasing the efficiency of image observation. More specifically, when details of an image are observed by changing the display magnification and/or display position and when the position of viewpoint is moved within the screen, the user may miss where he or she has been watching because he or she may be required to handle both of the change in display details and the movement of the viewpoint. In order to solve this problem, the designated position is desirably displayed for fewer movements of the position of viewpoint. When the display position is moved, the instructed focus area may be displayed at the position of viewpoint, as illustrated in FIG. 7B. When the display magnification is changed, the focus area may be kept at the position of viewpoint and the image with the changed display magnification may be displayed.

On the other hand, in some image observations, details may be observed with a predetermined display magnification or higher while the state of the entire subject may be observed with a magnification that is lower than the predetermined display magnification. Furthermore, the results of both of them may be compared and observed. For example, in a pathological image observation as illustrated in FIG. 3, the states of the forms of individual cells may be observed on an image displayed with a high magnification, and the degree of invasiveness and/or the position where a cancer occurs may be checked on an image displayed with a low magnification on the basis of a tissue characteristic of an organ. In this case, images for the same position are desirably compared and observed with different display magnifications, which may be implemented by display of images with different display magnifications on the display screen. Here, for the comparison and observation, the area in which an image is to be displayed with a high magnification must be searched. More specifically, an image displayed with a low magnification as illustrated in FIG. 7B may be zoomed in to check the area with a high magnification. In this case, while searching the area to be checked with a high magnification, the movement of the display position and the change of the magnification may be repeated. For that, fewer movements of the viewpoint are desirable. On the other hand, when the area to be checked with a high magnification is found and is compared with the image displayed with a low magnification for observation, the display position is moved by a user operation fewer number of times. Therefore, even when the position of viewpoint is moved within the display screen, the user may miss the part where he or she has been watching. An image may be displayed with a low magnification so as to include the focus area to be compared in an area outside the area to be checked with a high magnification as illustrated in FIG. 7C. Thus, the comparison and observation may be executed subsequently to the work of finding the area to be checked with a high magnification.

The positions of viewpoint 702 and 705 are indicated by rectangles in FIGS. 7A to 7C, but the present invention is not limited thereto. For example, the colors and/or luminances of the areas inside the position of viewpoint or outside the position of viewpoint may be different. Furthermore, markers indicative of the positions of viewpoint, excluding rectangles, may be displayed inside or outside the image display area 701. The present invention does not limit the method for presenting the positions of viewpoint as far as the position of viewpoint may be identified by a user. When the display of the position of viewpoint hinders a user from observing an image, it may be chosen to disable or enable the showing of the position of viewpoint.

According to this embodiment, the position of viewpoint is displayed at the center of a screen. However, the present invention is not limited thereto, and the display position of viewpoint may vary excluding the center position.

Furthermore, having described according to this embodiment that the focus position is designated to move the display position, the moving speed and/or the direction of movement may be designated when an image is to be observed by serially changing the display position and scanning the entire image, without designating a specific position. Also in this case, the application of the present invention allows image observation by moving a user's viewpoint a fewer number of times when the display position is moved and/or the display magnification is changed. It further allows image comparison and observation with different display magnifications on an image displayed with a high magnification.

As described above, according to this embodiment, the movements of a user's viewpoint may be reduced when an image is observed by repeating scrolling and/or scaling. Furthermore, according to this embodiment, during an observation work including repeated scrolling and/or scaling, comparisons and observations may be allowed with different magnifications on the focus area in an image. As a result, this may reduce the load on a user observing an image by repeating scrolling and/or scaling and may improve efficiency of the observation work.

Having described the preferred embodiments of the present invention above, the present invention is not limited to the embodiments and may be modified and changed variously without departing from its spirit and scope.

Figure 8A:
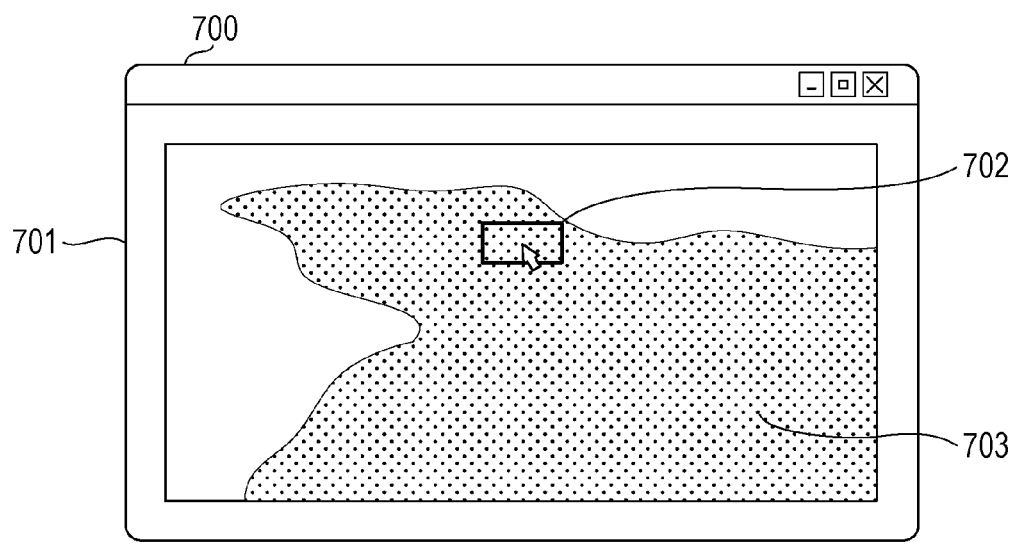
FIGS. 8A and 8B illustrate examples of a display screen according to other embodiments of the present invention.
Figure 8B:
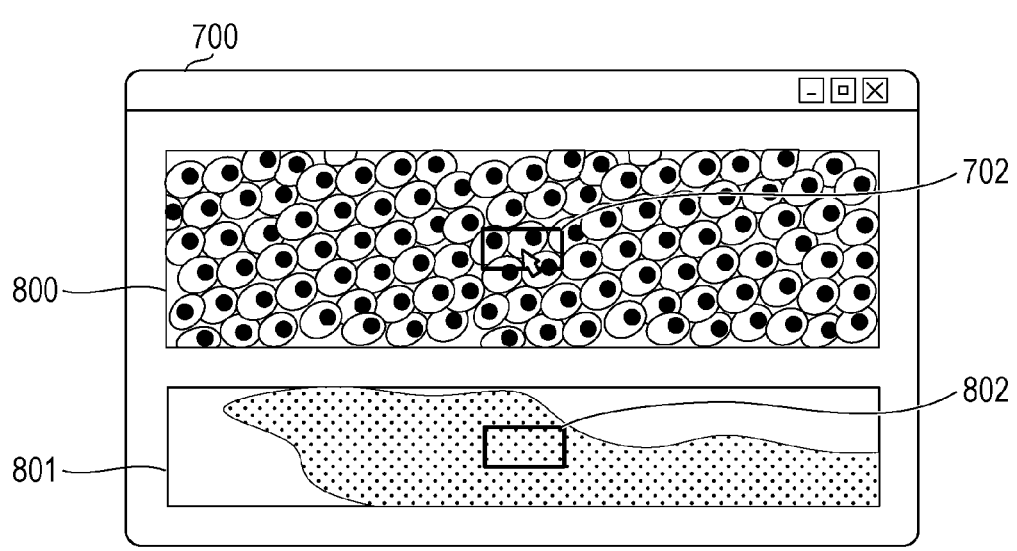

For example, according to the first embodiment, an image displayed with a high magnification is displayed over an image display area with a low magnification. However, the present invention is not limited thereto, but a display method including dividing an image display area, for example, may be applicable as far as it may reduce the movements of the user's viewpoint. FIGS. 8A and 8B illustrate an example in which a display area is divided. FIG. 8A illustrates a display screen in a basic display layout, and the descriptions on those referred by the same numbers as those in FIGS. 7A to 7C will be omitted. FIG. 8B illustrates a parallel display layout (second layout) in which a display area is divided, compared with the display layout in FIG. 8A. The position of viewpoint 702 is fixed on the image display area 701 or application window 700, like the aforementioned embodiments. The image display area 701 in FIG. 8A is divided into a high magnification image display area 800 and a low magnification image display area 801 in FIG. 8B. A low magnification image is displayed within the low magnification image display area 801 such that it contains a focus area and its surrounding area, as indicated by reference numeral 802 in FIG. 8B. On the other hand, the high magnification image display area 800 displays an image with a display magnification increased in accordance with an instruction to change the display magnification and displays a focus area in an image at the position of viewpoint 702.

In the example in FIGS. 8A and 8B, it may be chosen to disable or enable the dividing of the image display area in response to a change of the display layout. However, the layout illustrated in FIG. 8B may only be provided, and the image display area may be divided in advance, without changing the layout. In this case, an image to be changed in its display magnification thereof in accordance with an instruction to change the display magnification may be displayed on the image display area 800 containing the position of viewpoint 702, and an image to be compared without changing its display magnification thereof may be displayed on the other image display area 801. Only when the display magnification exceeds a predetermined display magnification, an image with a low magnification may be displayed on the image area 801. This may fix the image display positions in a parallel display layout and thus allow easy prediction of the display position of the focus area within a screen even when a display detail changes. The layouts are not limited to the descriptions above, but various layouts are applicable as far as the display of the focus area at the position of viewpoint may reduce the movements of a user's viewpoint.

Furthermore, having described according to the first embodiment that the position of viewpoint is predetermined, a user may change it as necessary. This allows designation of the position of viewpoint to a proper position in accordance with a display detail within the screen and improves efficiency of the observation work.

Having described that the aforementioned embodiments are implemented by a program executed by the CPU 200, the present invention is not limited thereto. For example, a part or all of the matters described above may be configured by hardware.

Furthermore, the present invention may allow generation of drawing data not only in the terminal 107 to which the display 108 is connected but also from a different terminal connected to a network. Drawing data transmitted over the network may be displayed by the display 108. In other words, it is applicable also in a system configuration in which the position where drawing data is generated and the position of a display that shows the corresponding image may be apart from each other.

According to the present invention, a mode applying the aforementioned drawing data generation method or image display method is not required to always execute, but a different mode from it may be executed depending on the situation (or in accordance with an instruction from a user or a determination by a computer).

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-067577 filed Mar. 23, 2012, which is hereby incorporated by reference herein in its entirety.

What is claimed is:

1. A drawing data generation apparatus comprising:
    at least one processor coupled via a bus to a memory, the processor being programmed to control one or more of:
        an image acquiring unit which acquires data on a captured image;
        a magnification acquiring unit which acquires a display magnification change instruction; and
        a generation unit which generates drawing data for displaying at least a part of the captured image as a display image on a display,
    wherein the generation unit generates the drawing data in a first layout when the magnification acquiring unit acquires an instruction to enlarge to a first magnification, and generates the drawing data in a second layout that is different from the first layout when the magnification acquiring unit acquires an instruction to enlarge to a second magnification that is higher than the first magnification,
    wherein in the first layout, a first partial area in the display image is displayed with the first magnification at a pre-determined position in the display image,
    wherein in the second layout, a second partial area in the display image is displayed with the second magnification at the pre-determined position, and the first partial area is displayed with a lower magnification than the second magnification, and
    wherein, generating the drawing data in the second layout, the generation unit changes a position of the first partial area with the low magnification from the pre-determined position so that the second partial area with the second magnification and the first partial area with the low magnification do not overlap.

2. The drawing data generation apparatus according to claim 1, wherein the at least one processor is further programmed to control
    a viewpoint position acquiring unit which acquires the position of viewpoint of a user,
    wherein the generation unit generates the drawing data such that the second partial area is displayed at the position of viewpoint.

3. The drawing data generation apparatus according to claim 1,
    wherein a display area with the second magnification is displayed in a display area with the low magnification in the second layout.

4. The drawing data generation apparatus according to claim 1,
    wherein a display area with the second magnification is displayed outside a display area with the low magnification in the second layout.

5. The drawing data generation apparatus according to claim 1,
    wherein a display area with the first magnification is only displayed in the first layout.

6. The drawing data generation apparatus according to claim 1,
    wherein the captured image is an image acquired by a microscope.

7. A drawing data generation method comprising:
    an image acquiring step of, by a computer, acquiring data on a captured image;
    a magnification acquiring step of, by the computer, acquiring a display magnification change instruction; and
    a generation step of, by the computer, generating drawing data for displaying at least a part of the captured image as a display image on a display,
    wherein the generation step generates the drawing data in a first layout when the magnification acquiring step acquires an instruction to enlarge to a first magnification; and generates the drawing data in a second layout that is different from the first layout when the magnification acquiring step acquires an instruction to enlarge to a second magnification that is higher than the first magnification,
    wherein in the first layout, a first partial area in the display image is displayed with the first magnification at a pre-determined position in the display image,
    wherein in the second layout, a second partial area in the display image is displayed with the second magnification at the pre-determined position, and the first partial area is displayed with a lower magnification than the second magnification, and
    wherein, generating the drawing data in the second layout, the generation step changes a position of the first partial area with the low magnification from the pre-determined position so that the second partial area with the second magnification and the first partial area with the low magnification do not overlap.

8. A program stored in a non-transitory computer-readable storage medium and causing a computer to execute the steps of the drawing data generation method according to claim 7.

9. A drawing data generation system comprising:
    a display;
    a drawing data generation apparatus which generates drawing data for display a captured image on the display;

an image acquiring unit which acquires data on a captured image;

a magnification acquiring unit which acquires a display magnification change instruction; and a generation unit which generates drawing data for displaying at least a part of the captured image as a display image on a display, wherein the generation unit generates the drawing data in a first layout when the magnification acquiring unit acquires an instruction to enlarge to a first magnification, and generates the drawing data in a second layout that is different from the first layout when the magnification acquiring unit acquires an instruction to enlarge to a second magnification that is higher than the first magnification, wherein in the first layout, a first partial area in the display image is displayed with the first magnification at a pre-determined position in the display image, wherein in the second layout, a second partial area in the display image is displayed with the second magnification at the pre-determined position, and the first partial area is displayed with a lower magnification than the second magnification, and wherein, generating the drawing data in the second layout, the generation unit changes a position of the first partial area with the low magnification from the pre-determined position so that the second partial area with the second magnification and the first partial area with the low magnification do not overlap.

* * * * *